J. HADKA.
AUTOMOBILE FENDER.
APPLICATION FILED JULY 12, 1912.

1,062,706.

Patented May 27, 1913.

Witnesses:
J. C. Devrik.
Earl C. Carlson

Inventor:
Joseph Hadka.
By Luther L. Miller
Atty.

UNITED STATES PATENT OFFICE.

JOSEPH HADKA, OF CHICAGO, ILLINOIS.

AUTOMOBILE-FENDER.

1,062,706.  Specification of Letters Patent.  Patented May 27, 1913.

Application filed July 12, 1912. Serial No. 709,002.

*To all whom it may concern:*

Be it known that I, JOSEPH HADKA, a citizen of the United States, residing at Chicago, in the county of Cook and State of Illinois, have invented certain new and useful Improvements in Automobile-Fenders, of which the following is a specification.

One of the objects of my invention is to produce an automobile fender simple and efficient in its operation, cheap of manufacture and strong and durable in its construction.

A further object is to provide a simple form of automobile fender capable of being securely and easily attached by the owner of the car without assistance of a skilled mechanic, and without the use of special machinery or tools, thus avoiding the necessity of sending the car to the shop and saving the time and expense that would thereby be required.

A further object of my invention is to enable the fender to be easily and quickly detached when it is not required.

A further object is to avoid the necessity for the drilling or boring of additional holes in any part of the framework of the car, which would necessarily tend to weaken that part. By the use of the improvements hereinafter described I avoid that difficulty by utilizing the bolts which are already in place in the car.

My invention may be adapted for use with a variety of cars; the specific form described and claimed herein is especially constructed for use with the Ford automobile, or a car of like construction.

My invention is illustrated in the accompanying drawings, in which—

Figure 1:
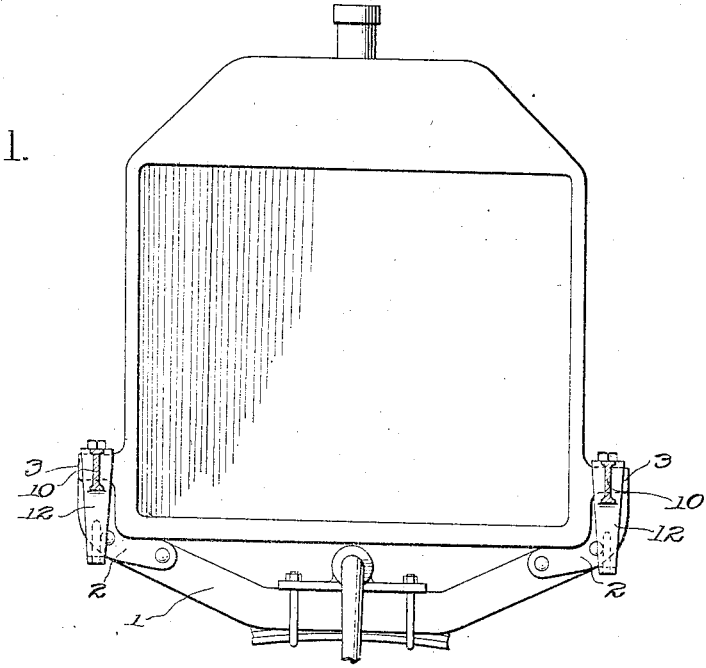
Figure 2:
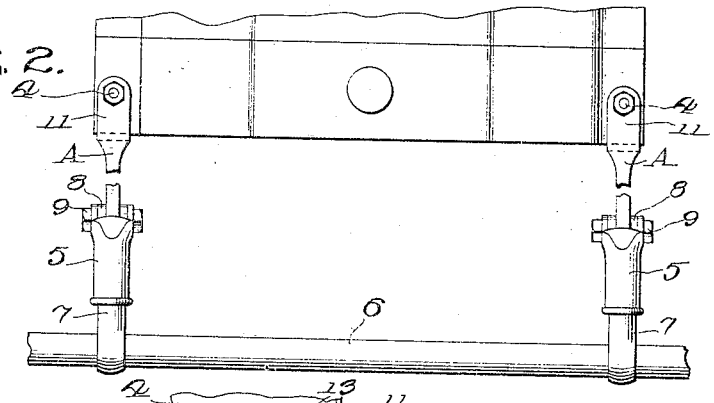
Figure 3:
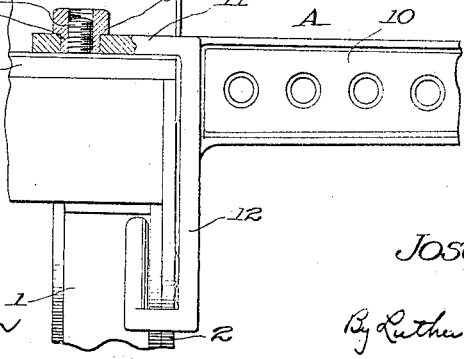

Figure 1 is a fragmentary front elevation of the Ford automobile, showing portions of my fender brackets in place. Fig. 2 is a fragmentary top plan view. Fig. 3 is a side elevation with a portion of the fender bracket arm and nut cut away.

In a car of the construction referred to there is a transverse channel bar 1 which forms a part of the chassis; at each end of this channel bar is riveted a plate 2 which serves to bind together the channel bars of the chassis and to conceal their junction. A projection 3 from the framework of the radiator is supported upon an angle iron of the chassis (not shown) and is secured thereto by means of a bolt 4.

The parts thus far described are found in the automobile as it comes from the factory. The fender which I have invented for attachment to a car of this construction comprise bracket arms A, extension members 5, an impact bar 6 and members 7 for connecting the impact bar with the extension members 5. The extension members 5 are connected with the bracket A by means of a sleeve 8 and a bolt 9, or by any other suitable means, and are chambered for the reception of a spring. While any suitable means may be employed to connect the impact bar with these chambered extension members, I prefer the construction set forth in my United States Letters Patent No. 1,026,981, issued May 21, 1912.

The bracket A consists of a horizontal arm 10 with a lug 11 and a hooked vertical arm 12. The lug 11 is flattened to extend over the top of the projection 3 and is provided near its end with an aperture for the reception of a bolt 4. As the automobile comes to the purchaser, the bolt 4 is secured by an ordinary nut and extends above the upper surface of the projection 3 only far enough to receive this nut. It is manifest, therefore, that when this nut is removed and the aperture in the lug 11 is placed over the bolt 4, the bolt will end either within the aperture or near its upper end, making it impossible to secure the lug 11 to the bolt by means of an ordinary nut. I have therefore provided a specially designed nut having a shoulder 13 and an extended depressed collar 14 screw-threaded throughout and of proper interior diameter to engage the thread of the bolt 4. The exterior diameter of this collar 14 is approximately the same as the diameter of the aperture in the lug 11, and the nut is therefore enabled to engage the thread of the bolt 4 within the said aperture. When the nut is tightened the shoulder 13 bears on the upper surface of the lug 11 and thus secures it to the bolt 4. To further secure the bracket A in place and to strengthen its connection with the automobile frame, I have provided the vertical hooked arm 12, which extends downward at right angles to the horizontal arm 10, and is either made integral therewith or rigidly connected thereto. This vertical arm ends in a hook which embraces the plate 2 and the flange of the channel bar 1, and bears against the anterior side of the plate 2 and the posterior side of said flange, as shown in Fig. 3, thus bracing the fender against vertical thrust. To attach this improved fender bracket to an automobile of the construction described, it is only necessary to remove the ordinary nut from the end of the bolt 4, place the lug 11 over the end of said bolt, adjust the hook in the position shown in the drawings and heretofore described, and apply and tighten the special nut. The impact bar is attached after the brackets are in place. If it is curved, it is necessary to remove one of the extension members 5, by withdrawing the bolt 9. The impact bar may then be inserted in the connecting members 7 and secured there by the means shown in my Letters Patent above referred to. The whole operation of attaching the fender requires but a few moments and can be performed by any one with an ordinary wrench found in the tool box.

I do not desire to limit myself to the precise form herein shown, since the proportions, form and manner of construction may be varied without departing from the spirit and substance of my invention.

What I claim as new and desire to secure by Letters Patent is:

1. In an automobile fender, in combination, a channel bar of an automobile; a bolt projecting through said channel bar; and a supporting bracket comprising a horizontally extending arm having an aperture adapted to receive the threaded end of said bolt, a downwardly extending hooked arm adapted to embrace the flange of said channel bar, and a shouldered nut adapted to engage the thread of the bolt within the aperture and to secure the said horizontal arm to the said bolt.

2. In an automobile fender, in combination, a transverse channel bar of an automobile; a projection from the frame of the radiator of the automobile; a bolt extending upwardly through said projection; a horizontal bracket arm having an aperture for the reception of said bolt; means for securing said arm to said bolt, and a vertical arm rigidly connected with said horizontal arm and having a hook adapted to engage the flange of said channel bar.

3. In an automobile fender, in combination, a transverse channel bar of an automobile; a projection from the frame of the radiator of the automobile; a bolt extending upward through said projection; a horizontal bracket arm having an aperture for the reception of said bolt; a nut having a recessed collar adapted to engage the thread of said bolt within said aperture and a shoulder adapted to engage the upper surface of said bracket arm; and a vertical bracket arm rigidly connected with said horizontal arm and having a hook adapted to engage the flange of the said channel bar.

In testimony whereof I hereunto affix my signature in the presence of two witnesses.

JOSEPH HADKA.

Witnesses:
I. J. HIEJSA,
ED. VOTAVA.